United States Patent
Tran-Ngoc (10) Patent No.: US 6,669,269 B1
(45) Date of Patent: Dec. 30, 2003

(54) MULTIPURPOSE WORKING, LOAD CARRYING AND CAMPING PLATFORM STRUCTURE

(76) Inventor: Truc Tran-Ngoc, 5925 Hemingway Rd., Mississauga (CA), L5M 5M1

( * ) Notice: Subject to any disclaimer, the term of this patent is extended or adjusted under 35 U.S.C. 154(b) by 0 days.

(21) Appl. No.: 10/380,992
(22) PCT Filed: Aug. 21, 2001
(86) PCT No.: PCT/CA01/01160
§ 371 (c)(1), (2), (4) Date: Mar. 19, 2003
(87) PCT Pub. No.: WO02/16165
PCT Pub. Date: Feb. 28, 2002

(30) Foreign Application Priority Data

Aug. 25, 2000 (CA) ............................................. 2317952

(51) Int. Cl.[7] .................................................. B60J 5/06
(52) U.S. Cl. ........................ 296/156; 296/169; 296/159; 296/26.02
(58) Field of Search ............................... 296/156, 164, 296/161, 173, 26.02, 169, 159, 158, 174, 162, 26.15, 165, 39.2; 135/88.15; 204/157.81; 224/510; 280/656; 47/60

(56) References Cited

U.S. PATENT DOCUMENTS

| | | | | |
|---|---|---|---|---|
| 3,623,762 A | * | 11/1971 | Fagan ....................... | 135/88.15 |
| 3,658,375 A | * | 4/1972 | Bowen ........................ | 296/164 |
| 3,703,311 A | * | 11/1972 | Davis et al. ................. | 296/161 |
| 3,715,141 A | * | 2/1973 | Cary ............................ | 296/173 |
| 3,768,855 A | * | 10/1973 | Laue ......................... | 296/26.02 |
| 4,057,284 A | * | 11/1977 | Blank .......................... | 296/169 |
| 4,113,301 A | * | 9/1978 | Olmstead .................... | 296/169 |
| 4,165,117 A | * | 8/1979 | Kaiser ........................ | 296/169 |
| 4,256,321 A | * | 3/1981 | Trulove ....................... | 296/173 |
| 4,273,351 A | * | 6/1981 | Salamander ................. | 296/159 |
| 4,284,484 A | * | 8/1981 | Sollott ..................... | 204/157.81 |
| 4,310,195 A | * | 1/1982 | Huff ............................. | 296/173 |
| 4,420,182 A | * | 12/1983 | Kaneshiro .................... | 296/158 |
| 4,554,884 A | * | 11/1985 | Bouliane ..................... | 296/174 |
| 4,652,040 A | * | 3/1987 | Mahan ........................ | 296/159 |
| 4,786,073 A | * | 11/1988 | Harper ....................... | 280/656 |
| 4,813,584 A | * | 3/1989 | Wiley ......................... | 224/510 |
| 5,118,245 A | * | 6/1992 | Dunkel ....................... | 280/656 |
| 5,375,902 A | * | 12/1994 | Church ....................... | 296/173 |
| 5,417,468 A | * | 5/1995 | Baumgartner et al. ....... | 296/162 |
| 5,448,853 A | * | 9/1995 | Harman ......................... | 47/60 |
| 5,462,330 A | * | 10/1995 | Brown ........................ | 296/173 |
| 5,478,129 A | * | 12/1995 | Goto et al. ............... | 296/26.02 |
| 5,570,898 A | * | 11/1996 | Albert ........................ | 280/656 |
| 5,988,731 A | * | 11/1999 | Eischen ....................... | 296/159 |
| 6,102,468 A | * | 8/2000 | Lowrey et al. ............. | 296/173 |

(List continued on next page.)

Primary Examiner—Kiran Patel (57) ABSTRACT

This patent describes a platform structure, which can be used either as a stand-alone unit, or as part of the body of a wheeled vehicle such as a trailer. As part of the body of a trailer its multipurpose feature allows the trailer to be easily converted into different modes of usage including: an extended platform, a flat-bed trailer with side walls, an open-top utility box trailer, or a compact highway trailer. The highway trailer, with a compactly collapsed body equipped with a cargo-rack, is intended to offer the best possible towing performance at highway speed. The cargo-rack has a screen enclosure for the containment of small or loose cargo items. When used as a stationary platform, said structure has a center portion with adjustable leg assemblies that can support and level the entire structure above the ground. Side sections are cantilevered on opposite sides of the center portion to form extensions to the main platform area. Fastening means for the erection of a camping tent on said platform are also disclosed. The side sections can also be firmly erected in an upright position to form side walls of an open ended utility trailer. Here the end sections can be easily attached to convert the latter into an open-top utility box trailer.

9 Claims, 7 Drawing Sheets

U.S. PATENT DOCUMENTS

| | | | |
|---|---|---|---|
| 6,113,174 A | * | 9/2000 | McPherson .............. 296/26.15 |
| 6,170,502 B1 | * | 1/2001 | Pullen ........................ 296/156 |
| 6,179,368 B1 | * | 1/2001 | Karlsson ..................... 296/159 |
| 6,217,106 B1 | * | 4/2001 | Reckner, Jr. ................ 296/173 |
| 6,283,536 B1 | * | 9/2001 | Muzyka et al. ............. 296/165 |
| 6,283,537 B1 | * | 9/2001 | DeVore, III ................. 296/168 |
| 6,416,101 B1 | * | 7/2002 | Bartch ..................... 296/26.02 |
| 6,435,594 B1 | * | 8/2002 | Ekonen et al. .............. 296/165 |
| 6,439,647 B1 | * | 8/2002 | Baldwin ..................... 296/165 |
| 6,536,827 B2 | * | 3/2003 | Oswald et al. ............. 296/39.2 |
| 6,565,139 B2 | * | 5/2003 | Bayerle et al. ............. 296/159 |
| 6,604,777 B2 | * | 8/2003 | Neville ....................... 296/164 |
| 2002/0163221 A1 | * | 11/2002 | Smith ......................... 296/164 |

\* cited by examiner

MULTIPURPOSE WORKING, LOAD CARRYING AND CAMPING PLATFORM STRUCTURE

TECHNICAL FIELD

This invention relates to a multipurpose structure for use as a stand-alone utility platform that can be supported and levelled above the ground, or as a load-carrying platform on a wheeled vehicle such as trailer or pickup truck. Said structure is convertible between different modes of usage, including: an extended platform, an open-ended U-shaped assembly with flatbed and sidewalls, an open-top utility container, or a compactly collapsed structure with a cargo carrying rack.

Although the article of the present invention can be used as a stand-alone structure removably attachable to a wheeled vehicle to be carried by the latter, for descriptive purposes in the following disclosure we mainly refer to said structure as forming an integral part of a trailer.

BACKGROUND OF THE INVENTION

Many previous patents teach the art of the collapsible trailer's construction, which allows the trailers to be reduced to a more compact non-used shape for stowage or for expanding the trailer body in order to carry a larger or longer load on the flatbed area. When used on the highway, these trailers are still too bulky and as a result they obstruct the driver's rear view, they do not offer fuel economy or the safest possible towing performance (e.g., FR 1.081.030; U.S. Pat. No. 2,557,347; U.S. Pat. No. 3,715,141).

Most of the structures from prior arts are confined to one specific purpose where, in the majority of cases, they would be used as a camper (e.g. U.S. Pat. No. 5,988,731; U.S. Pat. No. 4,198,996). Such single use structures failed to attract the majority of consumers who find it hard to justify the price and storage space required for owning such device. The above comment is also applicable to each of the many interchangeable transportation apparatuses that one can attached to a wheeled chassis as disclosed in U.S. Pat. No. 3,524,659.

Many prior arts (e.g. U.S. Pat. No. 5,080,426)offer an expandable design where a large top or cover section of the trailer is folded out and then supported on the ground independent of the main body. Such designs require a flat campground surface for proper erection, demanding more skill from users. A challenging campground would have uneven surfaces, unleveled surfaces or surfaces interspersed with small rocks and/or bushes. In any of these cases, it would be impossible to set up campers as taught by the above prior arts or to erect conventional tents on the ground without first preparing the surface.

Very often tents are custom fitted to the trailers and are erected up with an unfolding or raising up of different parts of the trailer (e.g., U.S. Pat. No. 5,375,902). The prior art does not teach a type of trailer construction that can be used with any standard tent design; this would conveniently complement the need of tent owners.

Many patents (FR 1.081.030; UK 2 035 915; U.S. Pat. No. 3,715,141) disclose a platform construction whereby side sections are partially supported from the ground and require additional adjustment from that of the center portion during each set up. The concepts presented in U.S. Pat. No. 2,557,347 use stakes and receiving pockets and that of FR 1.315.737 use a larger trailer chassis than the usable flatbed surface as a means to support the folded-out sidewalls. Such assemblies do not provide a solid stand-alone platform, they have limited load-carrying capacity on the extended sidewalls or cannot be deployed quickly from one configuration to the other.

There is no prior art that teaches the construction of a convertible trailer having side sections that can be quickly raised from a horizontal position and be held rigidly in an upright position relative to the flatbed area to form an open ended U-shaped utility trailer. Such configuration is very useful for the transportation of long articles such as lumbers, canoe, etc.

DISCLOSURE OF THE INVENTION

It is, therefore, a principal object of the present invention to provide a multipurpose trailer which can be easily and quickly converted between different modes of usage: a working or camping platform, a U-shaped trailer with flatbed and rigid sidewalls, an open-top utility box trailer, or a compact cargo-rack trailer. The versatility of the current invention will justify the cost and space requirements involved in owning such a trailer.

It is another object of the present invention to provide a maintenance-free camper that offers instead, an extended camping platform that can be utilized with any standard tent design. This is intended to make tent usage more functional and practical, to offer a low cost alternative to owning a camper, and to provide a complementary product for tent owners.

It is still another object of the present invention to provide a compact trailer for highway use. Having the most compact body cross-sectional area, this trailer offers a minimal frontal draft for highest fuel efficiency, does not obstruct the driver's field of vision through rear view mirrors and is the least affected by lateral wind. This insures the easiest and safest highway towing performance. The other modes of usage present a larger trailer body but are only required for hauling bulkier loads at relatively slower speeds.

It is a further object of the present invention to reduce the cost of such a multipurpose trailer by minimizing the number of components. This is achieved through a judicious design of the many components of the trailer, having them perform different tasks during different modes of usage.

Furthermore, it is another object of the present invention to provide a cargo-rack on a wheeled vehicle installed at a much lower deck elevation compared to racks normally equipped on a car roof. This tremendously facilitates the loading and unloading of cargo items.

Many other objects will in part be obvious and in part be described hereinafter.

The main structure of the present invention comprises a center portion, which offers a main flatbed area, and side sections that are configurable into different positions. Said center portion is firmly erected on the ground by means of four adjustable post assemblies which extend downward at the four corners of said flatbed area. Said posts firmly engage the ground's surface to support and level said center portion in a stationary and levelled plane above the ground.

Side sections are pivotally connected on opposite sides of said center portion by multiple hinges having pivot axes parallel to the longitudinal edge of said center portion. These hinges located near the upper edges allow the side sections to be unfolded to a position where their surfaces lie in a coplanar relationship with the top surface of said center portion. In this position the bottom edges of the side sections are supported by a plurality of vertical load bearing surfaces disposed on the connected sides of the center portion. Side sections are therefore fully cantilevered from the center portion, forming extensions on both sides of the main flatbed area.

This type of extended platform is very easy and quick to set up on any ground condition, side sections do not need to be supported from the ground, thus no additional adjustment is required. The platform can be used for working or camping. For example, when used as a platform for the erection of a camping tent, it offers many benefits that include the following:

- A platform that can accommodate any stand-alone standard tent design, offering a flat surface for the sleeping comfort of tent users independent of the campground condition.
- Preventing the ingress of water, insects, or reptiles into the tent living area.
- Isolating of the tent floor from ground's surface humidity and dampness.
- Eliminating the need for preparation of the campground surface under the tent platform.

Fastening means are provided for removably erecting any standard tent design on the platform. These allow a quick erection and removal of a tent without disturbance to the trailer for the other modes of usage. As a result, provision can also be made for erecting many different tents on the same trailer platform, thus allowing the greatest flexibility to users.

When the trailer is used for carrying a load, center posts on the adjustable post assemblies are retracted upwardly away from the ground. In this movement the upper end portions of said posts are caused to engage with holding rings located at forward and rear ends and near freely swinging side of the hingedly connected side section. This provides a releasable holding means to hold said side sections in a generally upright position forming an open-ended U-shaped trailer with flatbed and sidewalls for the transportation of elongated articles such as lumber, ladder, canoes, etc.

In another utility mode, end sections are slidably attached at opposite ends of the trailer to form an open-top utility box trailer for the containment and transportation of comminuted materials such as sand, garden soil, etc. A cover may be added to fully enclose the utility box trailer.

During highway use, the side sections are compactly folded and securely held down on top of said center portion to offer the lowest possible trailer profile. A cargo rack is provided on top surfaces of the folded panels for the transportation of general cargo, such as luggage for a highway trip. An enclosure is also included on the rack for the secure holding and locking of loose or small articles such as hand tools or camping accessories.

The cargo-carrying feature of the rack can also be used in other folded positions of the side sections. For example, it is a place where garden tools are securable while the trailer is used for transporting gardening materials.

Moreover, the racks are designed to stiffen the side sections and provide strength and load handling capacity, allowing side sections to be used as cantilevered platform extensions, this will be explained later in the description of the preferred embodiment of the invention. The resulting high bending stiffness of the side sections also allows for them to be supported only at the front and back ends. This spares the middle section from any disturbances, and maximizes the usable flat platform surface area.

The preferred embodiment is that of the body structure of a trailer, however as aforementioned, the present invention can be used as a stand-alone unit and can be removably attached to and be carried by a wheeled vehicle such as a trailer or pickup truck. Once on site it can be set up, firmly anchored, supported and levelled on the ground. The wheeled vehicle can then be detached for other uses.

In another alternative the structure can also form an integral part of the body of another type of wheeled vehicle such as a pickup truck. This is where it would replace the cargo tub on the chassis of said vehicle.

DETAILED DESCRIPTION OF THE PREFERRED EMBODIMENT

Figure 1:
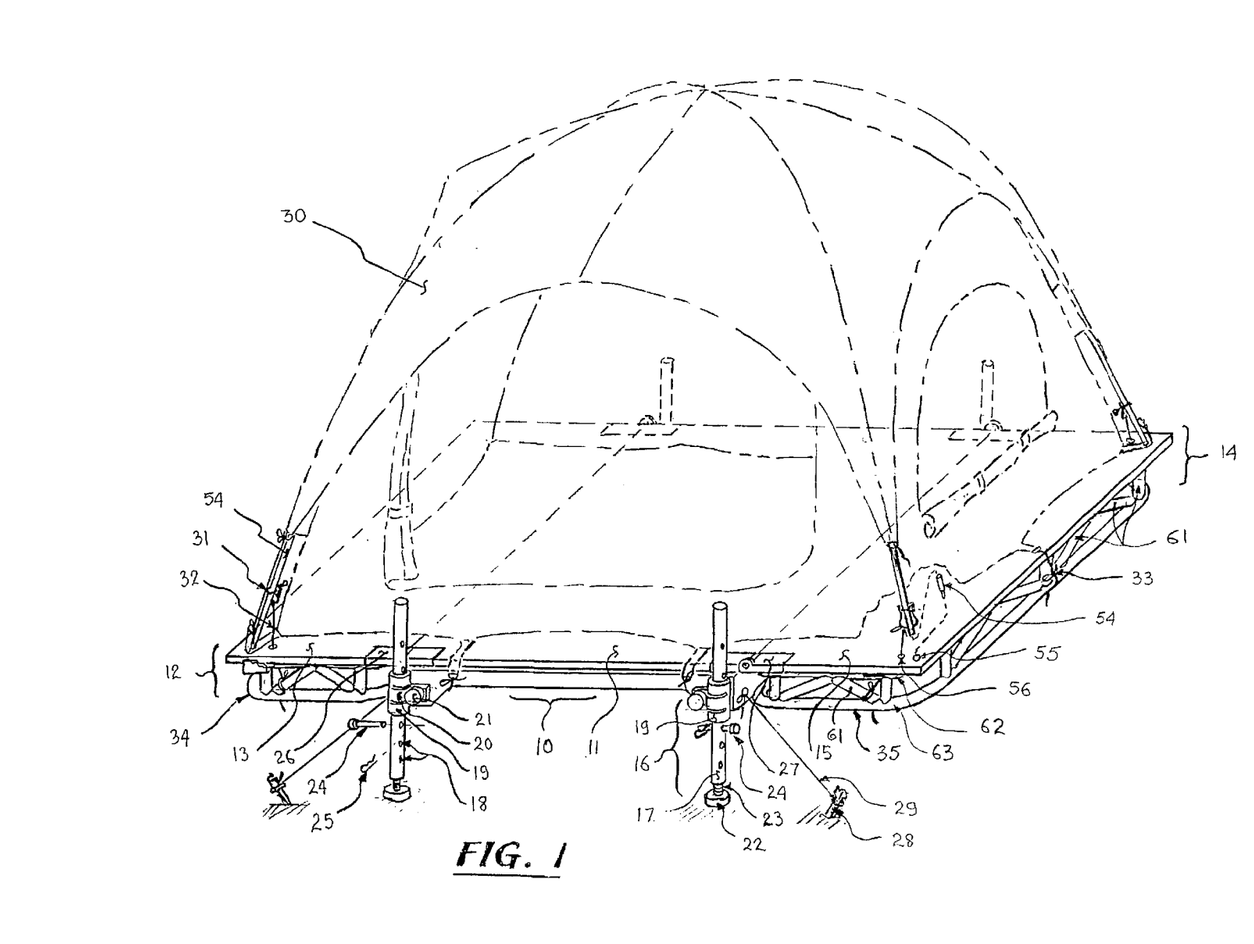
FIG. 1 is an isometric rear view of the structure of the present invention in its extended platform mode of usage, it is in use with a tent shown in phantom lines for camping purpose.
Figure 2:
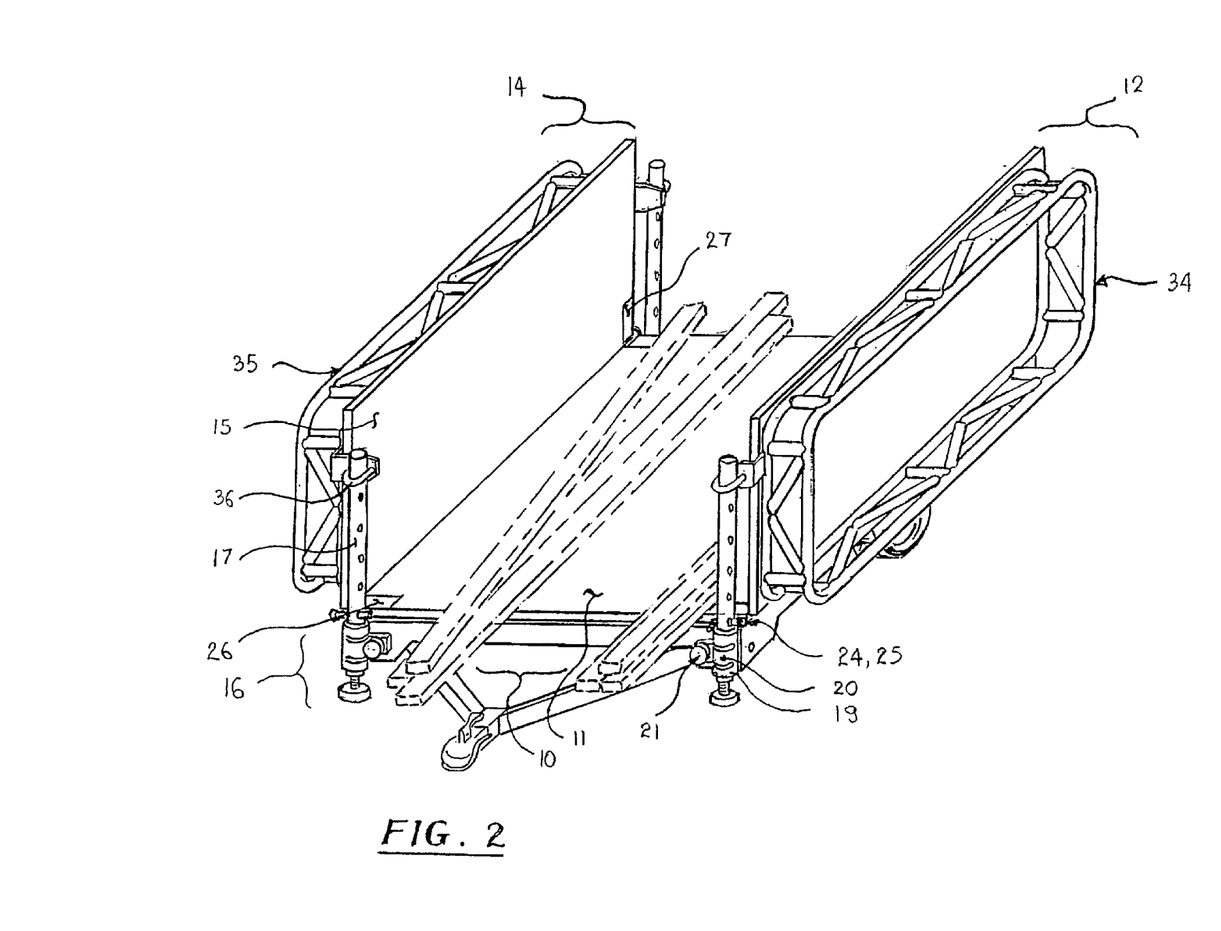
FIG. 2 is an isometric front view of the present invention configured into a U-shaped trailer with flatbed and sidewalls, carrying a load of lumber shown in phantom lines.
Figure 3:
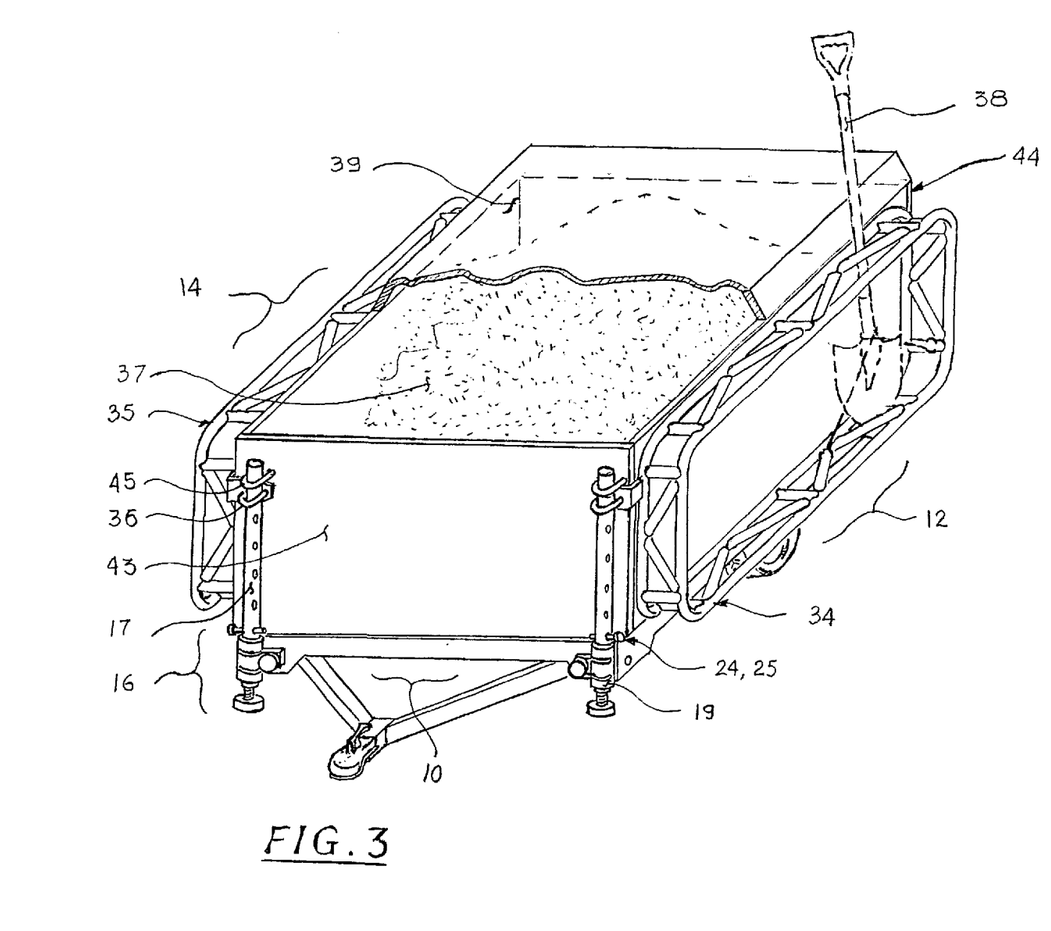
FIG. 3 is an isometric front view of the inventive trailer in its open-top utility box configuration, containing a load of top soil and transporting a shovel shown in phantom lines.
Figure 4:
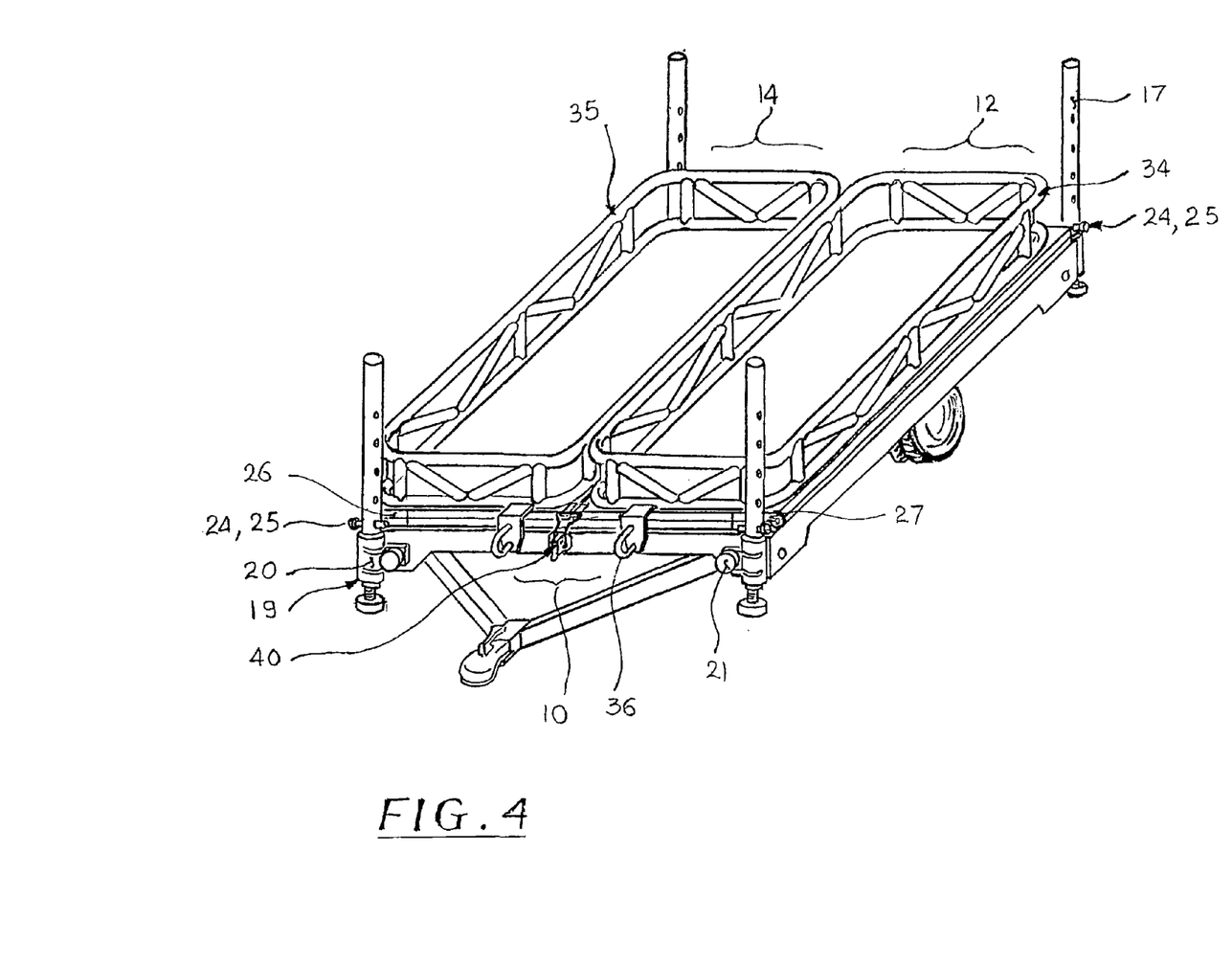
FIG. 4 is an isometric front view of the inventive trailer in its compactly collapsed body configuration intended for highway use.
Figure 5:
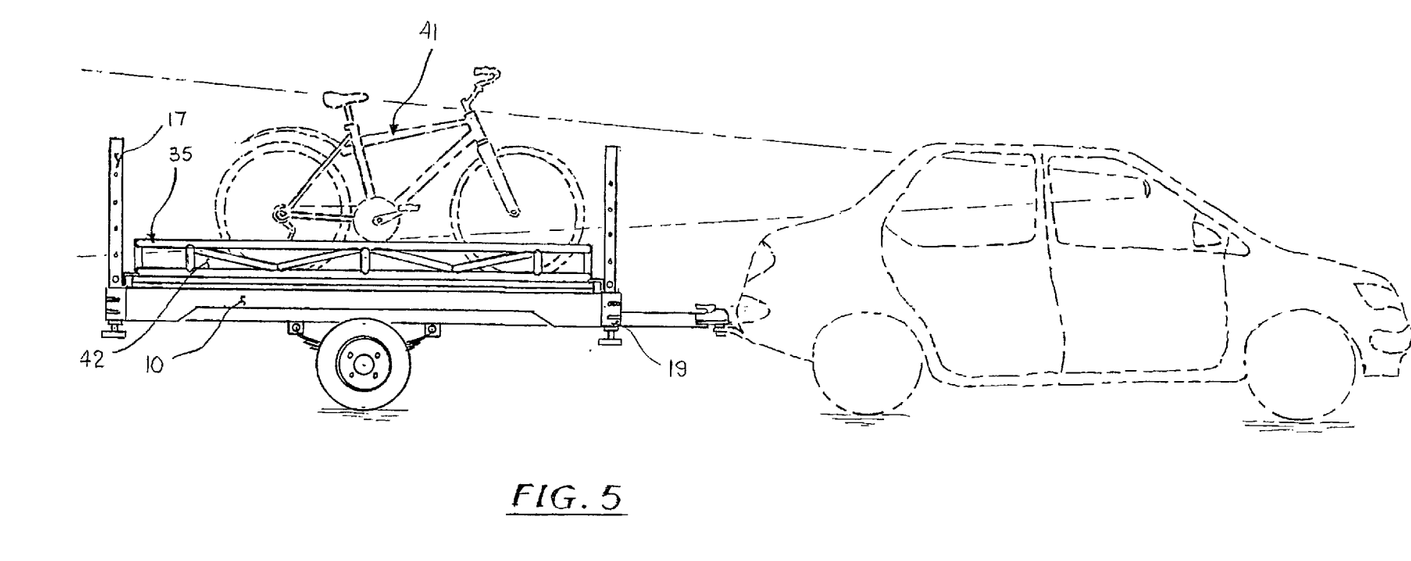
FIG. 5 is a side view of the inventive trailer in its highway use configuration carrying a bicycle and being towed behind a small car, both shown in phantom lines.

Referring now to the drawings, the structure is shown converted between different modes of usage: an extended platform in FIG. 1, a U-shaped trailer with flatbed and sidewalls in FIG. 2, an open-top bulk load container in FIG. 3, or a compact cargo-rack trailer in FIGS. 4 and 5.

As shown in FIG. 1, the structure comprises a center portion 10 that has a flat surface with a length and a width that defines a flatbed area 11. Four adjustable post assemblies 16 are solidly mounted at the four corners of said flatbed area. Each of said adjustable post assemblies comprises a center post 17 slidably adjusted in the axial direction inside a sleeve 19. Said center posts can be extended downward to firmly engage the ground's surface to support and level said center portion in a stationary and levelled plane above the ground. Said sleeve 19 has a variable radius portion 20 with clamping means 21 that reduces its radius to firmly grip and hold said center post in a given axial position. End foot 22 has threaded stem 23 that engages matching threaded hole disposed at the end of said center post, to allow finer adjustment of the vertical elevation of the platform when needed.

A series of holes 18 drilled at preset distances from each other along the length of the center post for the insertion of the safety pin 24. A corresponding retaining pin 25 keeps the safety pin in place on the center post. In this mode of usage, the safety pin 24 is used to limit the vertical drop of the platform should the clamping means 21 loose its grip on the center post 17. For this purpose said safety pin is inserted through the closest holes 18 that are accessible below the sleeve 19.

Side sections 12, 14 are connected to opposite sides of said center portion 10 by hinges 26,27 having pivot axes parallel to the longitudinal edges of said center portion. The hinges are located near the upper edges of the connected sides of said center portion and side sections, in such a way that said side sections can be unfolded to a position where their top surfaces 13, 15 lie in a coplanar relationship with said flatbed area 11 of said center portion 10. In this position, the bottom edges of said side sections 12, 14 strike against a plurality of generally vertical load bearing surfaces disposed on the connected side of said center portion. The vertical distance between the hinge axis and the load bearing surfaces creates a supporting moment arm that allows each side section to be fully cantilevered from said center portion 10, forming an extended platform.

In this mode of usage racks 34, 35, located underneath the floor panels of side sections 12,14, are used to create a set of lowered bottom edges on the side sections. The lower bottom edge increases the supporting moment arm and thus the load-carrying capacity of the cantilevered side sections. Cross-structural members 61 link top to bottom frame members 62,63 of the rack forming a truss-like structure to provide the desired bending stiffness to said side sections.

FIG. 1 also shows a standard tent 30 erected on top of said extended platform and anchored thereon by means of special adjustable clamp assemblies 31 and hold-down ropes 32. These and other ropes 33, that are used to tie down intermediate tent flap anchors, are tied to the racks 34, 35 to keep the tent fully taut around its perimeter, the tent pole anchoring method will be described in more details in FIG. 6.

Ground pegs 28 and ropes 29 are used to firmly anchor the extended platform to the ground at the four corners of said center portion 10.

Attention is now turned to FIG. 2 and FIG. 3 wherein the present invention is shown converted into an open ended U-shaped trailer with flatbed and sidewalls and then with end wall sections added to form an open-top utility box trailer. Here, the center posts 17 of adjustable post assembly 16 are retracted away from the ground and slid fully upward. The upper end portions of said center posts engage holding rings 36 located at opposite ends of the hingedly connected side sections 12,14 near their free-swinging side. This provides a holding means to selectively and firmly hold said side sections in a substantially upright position forming rigid sidewalls. Safety pins 24 are now used to prevent the center post 17 from accidentally sliding down should the clamping means 21 become loose. For this purpose, each of said safety pin is inserted through the nearest hole in the center post that is accessible right above the sleeve 19.

Racks 34,35 are now found on the outside of the sidewalls and can be used as cargo carriers. The stiffness of the racks impart strength to the sidewalls in this mode of usage and give them load handling capability, they provide longitudinal bending stiffness to the sidewalls which are only supported at the ends by hinges 26,27 and holding rings 36.

FIG. 2 shows the version of an open-ended U-shaped trailer with flatbed and upright sidewalls transporting a load of lumber studs that protrude out beyond end boundaries of the flatbed area 11. FIG. 3 shows that of an open-top utility box trailer where end sections 43,44 are slidably inserted at opposite open ends of the U-shaped trailer to define a cargo carrying volume for the containment of comminuted material such as a load of top soil 37 as shown in the figure. Rings 45 disposed near the top sides of end sections 43,44 are slid over said center posts bracing the utility box in the transverse direction and adding rigidity to the entire structure. A shovel 38 is shown attached to the rack illustrating its typical use in this utility trailer mode. A cover 39 is provided on the open-top to fully enclose the hauled load.

As aforementioned, FIG. 4 shows the trailer in its compactly collapsed version for highway towing. The side sections 12, 14 are completely folded toward the center of the trailer and disposed in a compactly retracted position where they lie closely adjacent and generally parallel to the center portion. Latches 40 provide a hold-down means to secure side sections on top of said center portion 10. In this mode of usage, racks 34, 35 are found on the top of the trailer ready for carrying traveling luggage or any general cargo load. Safety pins 24 are also set in a similar way to that described earlier in FIGS. 2 and 3 to prevent the center posts 17 from dropping down accidentally.

FIG. 5 shows a side view of the compactly collapsed trailer being towed behind a car. It illustrates the fact that the rear view mirror field of vision is unobstructed by the trailer body and is only partially obstructed by the carried bicycle 41. The low elevation of the cargo deck 42 of the inventive trailer tremendously facilitates the loading and unloading of the cargo items.

Figure 6:
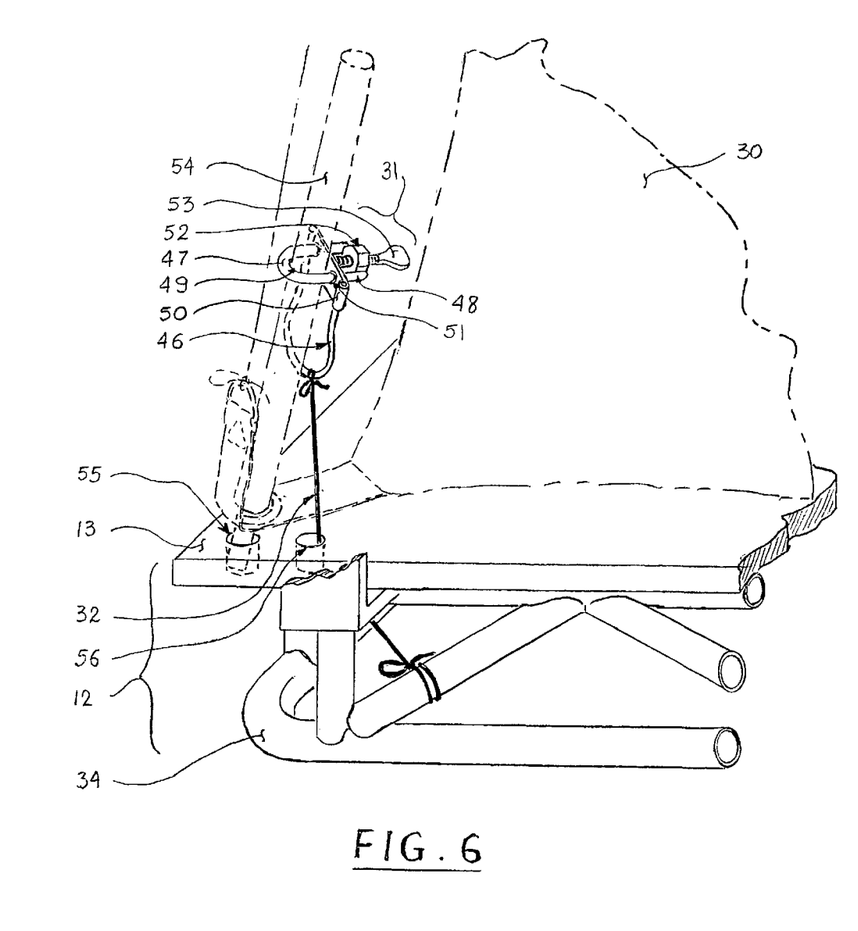
FIG. 6 is an enlarged isometric view illustrating the technique used to anchor a tent on the camping platform of the present invention.

The enlarged view of FIG. 6 best illustrates the technique and devices of the fastening means that is used to anchor typical standard tent poles on the trailer platform. The fastening hardware comprises an adjustable clamp assembly 31, a set of tent pole receiving holes 55, a set of holes 56 for passing hold-down ropes through to the underside of the platform, and hold-down ropes themselves 32.

Each of said adjustable clamp assembly 31 is formed by: a piece of wire 47 bent into a U shape, a metal tab 50 with 2 holes 51 engaging the straight sections 48 of the U-shaped bent wire 47 where it is free to slide up and down along the body of said piece of wire, and a nut 52 attached across the ends of the bent wire closing the loop. A second ring is formed by a second piece of wire bent into a horseshoe shape 46 and connected ends to ends onto said metal tab 50, said second ring provides a means for the attachment of a hold-down rope 32.

The half circular section 49 of said U-shaped bent wire 47 and the metal tab 50 define the adjustable area wherein a standard tent pole 54 is inserted through. A screw 53 engaging the nut 52 pushes on the metal tab to firmly hold the clamp assembly onto the body of the tent pole 54. Said second piece of wire 46 is bent slightly away from the tent pole to facilitate the attachment of one end of the hold-down rope 32.

During tent erection, the ends of the tent poles 54 that protrude downward from the tent assembly are first inserted into receiving holes 55 provided on the floor panels of the platform. Lower ends of hold-down ropes 32 are fed through holes 56, provided on the floor panels, to the underside of the floor panel where they are strung and tied to the frame of the cargo-racks to keep the ends of the tent poles 54 firmly in place in its receptive holes 55 on the platform. Tent flaps are also anchored in a similar way by hold-down ropes and the corresponding holes on the floor panels.

Figure 7:
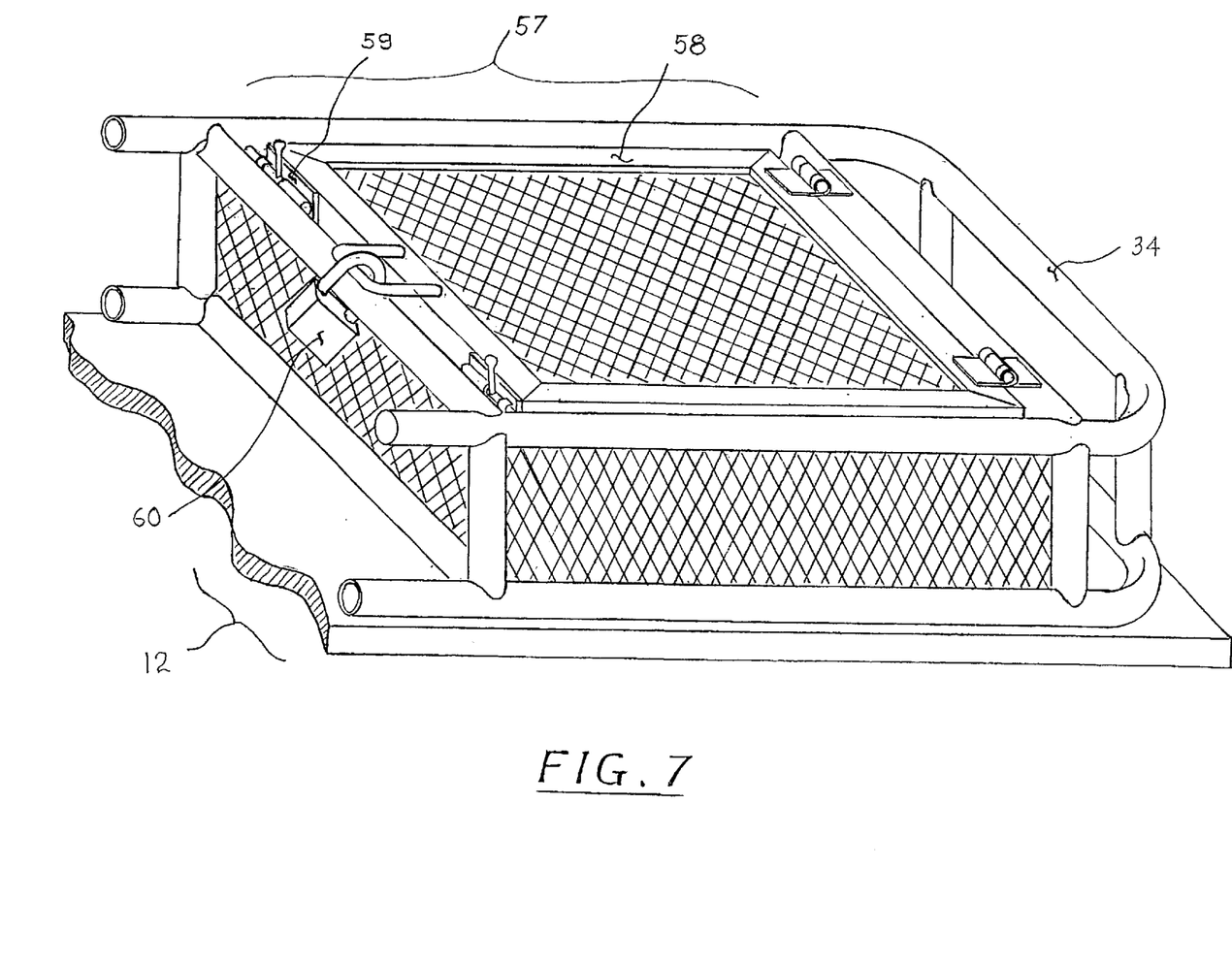
FIG. 7 is an enlarged isometric view of a partial enclosure equipped on the cargo-rack of the present invention.

FIG. 7 shows a rack equipped with a screened enclosure 57 used for the storage of small or loose articles such as hand tools or camping accessories. The enclosure has door 58 that hinges open on the top side of the rack to allow convenient access to the storage area in at least 2 positions of the side section 12, both the compactly folded and the upright positions. Standard latch mechanisms 59 and lock 60 hold the doors tightly shut in all modes of usage. The enclosed section of the rack has enough bending stiffness such that normal diagonal truss members may be omitted.

What is claimed is:

1. A multipurpose structure convertible between different utility modes including an open ended U-shaped assembly for use mainly as a stand-alone load-carrying platform or as a platform on a wheeled vehicle comprising:

a center portion having a flat surface with a length and a width that defines a flatbed area, a pivotal connecting means that connects side sections in a coplanar relationship to said center portion near the upper edges, a plurality of lower load bearing surfaces disposed on the connected sides of said center portion and located at a vertical distance below said connecting means to receive and support the bottom edges of said side sections, said connecting means in combination with said lower load bearing surfaces connect and support said side sections in a fully cantilevered manner on opposite sides of said center portion while allowing substantial load-carrying capacity to said side sections, said center portion having a plurality of adjustable posts engaging the ground to firmly support and level said structure in a stationary and leveled plane above the ground, each of said adjustable posts having an upper end portion that protrudes above the flat bed area, a holding means to releasably connect the freely swinging sides of said side sections to said upper end portions of said posts to hold said side sections in an upright position forming an open ended U-shaped assembly.

2. The structure as defined in claim 1 wherein said side sections are disposed in a compactly retracted position, in this position said side sections lie closely adjacent and generally parallel to said center portion, a releasable hold-down means is provided to secure said side sections to said center portion.

3. The structures as defined in claim 1 in which end sections are removably attached to opposite open ends of said U-shaped assembly when said side sections are held in the upright position by said upper end portions of said posts.

4. The structure as defined in claim 1 further comprising a pair of wheels mounted on an axle extended transversely to said U-shaped assembly, a pair of shock absorbing spring assemblies connecting said structure to said wheel axle, a towing frame and hitch assembly attached to said center portion.

5. The structure as defined in claim 1 wherein said center portion is directly mounted on the chassis of a pickup truck, replacing the body of a cargo tub normally equipped on said pickup truck.

6. The structure as defined in claim 1 wherein;

said adjustable posts, supporting and leveling said center portion, comprise four ground engaging adjustable post assemblies each having a center post slidably adjusted in the axial direction inside a sleeve, said sleeve having releasable clamping means to firmly hold said center post in any axial position, said sleeve being solidly connected to said center portion at each corner of said flatbed area, said connecting means to connect said side sections to opposite sides of said center portion comprises a plurality of hinges, having pivot axes parallel to the longitudinal edges of said center portion, said holding means, connecting the freely swinging side of said hingedly connected side sections to said adjustable posts, comprises a pair of holding rings attached at opposite ends near the freely swinging side of each side section, whereby each said center post when sliding upward, engages said holding ring to hold said side section in an upright position.

7. The structure as defined in claim 2 wherein said side sections comprise a plurality of racks for cargo carrying when said side sections are disposed in said retracted position; said racks lower the bottom edges of said side sections when said side sections are configured as cantilevered extensions to said center portion, said lowered bottom edges and the correspondingly disposed load-bearing surfaces on the center portion increase the supporting moment arm from said pivotal connecting means to impart greater strength and load-carrying capacity to said side sections.

8. The structure as defined in claim 7 wherein said cargo carrying racks further comprise a partially or fully enclosed portion with a latched and lockable door that hinges open on the top side of said rack allowing access to the enclosed area.

9. The structure as defined in claim 1 further comprising fastening means for anchoring standard tent poles and tent flaps on said extended flatbed area, said fastening means comprising adjustable clamp assemblies removably attached to the poles of standard tents to allow the attachment of one end of hold-down ropes, a first set of holes provided on the floor panels of said side sections or center portion to receive the ends of tent poles, a second set of holes provided on the floor panels of said side sections or center portion for passing said hold-down ropes to the underside of the floor panels where they are tied to anchor points to hold ends of tent poles firmly in place in said first set of holes.

* * * * *